United States Patent
Haney et al.

(10) Patent No.: US 12,070,999 B2
(45) Date of Patent: Aug. 27, 2024

(54) PORTABLE FUEL TANK ASSEMBLY AND PORTABLE FUEL TANK SUPPORT

(71) Applicant: Brunswick Corporation, Mettawa, IL (US)

(72) Inventors: Trevor R. Haney, Jenison, MI (US); Kevin T. Downey, Rockford, MI (US); Kyle A. Walters, Kalamazoo, MI (US); Christopher C. Bostwick, Rockford, MI (US)

(73) Assignee: Brunswick Corporation, Mettawa, IL (US)

( * ) Notice: Subject to any disclaimer, the term of this patent is extended or adjusted under 35 U.S.C. 154(b) by 152 days.

(21) Appl. No.: 17/667,126

(22) Filed: Feb. 8, 2022

(65) Prior Publication Data

US 2023/0249542 A1  Aug. 10, 2023

(51) Int. Cl.
*B60K 15/03* (2006.01)
*F16L 37/32* (2006.01)

(52) U.S. Cl.
CPC .............. *B60K 15/03* (2013.01); *F16L 37/32* (2013.01); *B60K 2015/03453* (2013.01)

(58) Field of Classification Search
CPC .......... B60K 15/03; B60K 2015/03453; B60K 2015/03184; F16L 37/32; B63B 17/0027
See application file for complete search history.

(56) References Cited

U.S. PATENT DOCUMENTS

| | | | | |
|---|---|---|---|---|
| 2,915,325 A | * | 12/1959 | Foster | F16L 37/02 |
| | | | | 251/149.7 |
| 3,168,904 A | * | 2/1965 | Conover | B60K 15/03 |
| | | | | 73/317 |
| 3,409,040 A | * | 11/1968 | Weston | B63B 17/0027 |
| | | | | 137/572 |
| 4,653,552 A | | 3/1987 | Friedle | |
| 4,911,203 A | | 3/1990 | Garms | |
| 5,297,578 A | | 3/1994 | Scott et al. | |

(Continued)

FOREIGN PATENT DOCUMENTS

EP  0114585 A2  8/1984

OTHER PUBLICATIONS

Attwood Corporation, "Marine Products Collection 2022"; 2022, pp. 76-80.

(Continued)

*Primary Examiner* — Patrick C Williams
(74) *Attorney, Agent, or Firm* — Andrus Intellectual Property Law, LLP

(57) ABSTRACT

A portable fuel tank assembly includes a portable fuel tank for holding fuel and a support to be connected to a supporting surface for holding the fuel tank stationary with respect to the supporting surface. The fuel tank has a first quick connector for fluid communication with the fuel in the fuel tank. The support has a second quick connector for mating and providing fluid communication with the first quick connector. The fuel tank and support are configured such that securing the fuel tank in the support simultaneously mates the second quick connector to the first quick connector to provide for fluid communication between the second quick connector and the fuel in the fuel tank. A support for holding a portable fuel tank is also provided.

20 Claims, 5 Drawing Sheets

(56) References Cited

U.S. PATENT DOCUMENTS

| | | | | |
|---|---|---|---|---|
| 5,794,559 | A * | 8/1998 | Graham | B63B 7/087 |
| | | | | 220/563 |
| 6,352,183 | B1 * | 3/2002 | Kristiansen | B67D 1/0431 |
| | | | | 222/88 |
| 6,530,399 | B2 * | 3/2003 | Nguyen | A61L 2/24 |
| | | | | 141/330 |
| 8,651,068 | B1 | 2/2014 | Torgerud et al. | |
| 9,114,701 | B2 | 8/2015 | Bostwick | |
| 9,315,099 | B2 | 4/2016 | Whelan et al. | |
| 9,409,476 | B2 | 8/2016 | Randolph et al. | |
| 9,605,803 | B2 | 3/2017 | Bostwick et al. | |
| 10,086,691 | B2 | 10/2018 | Whelan et al. | |
| 2005/0103387 | A1 * | 5/2005 | Voege | F16L 37/32 |
| | | | | 137/614.04 |
| 2010/0327575 | A1 * | 12/2010 | Blanchard | F16L 37/1215 |
| | | | | 285/34 |
| 2013/0092271 | A1 | 4/2013 | Downs et al. | |
| 2014/0238529 | A1 * | 8/2014 | Komuniecki | B67D 7/38 |
| | | | | 141/382 |

OTHER PUBLICATIONS

"Declaration of Prior Art by Trevor Haney," admitted prior art, dated Feb. 9, 2022, 5 pages.

European Search Report in corresponding EP Application No. 23153395.1, dated Jul. 13, 2023, 5 pages.

* cited by examiner

PORTABLE FUEL TANK ASSEMBLY AND PORTABLE FUEL TANK SUPPORT

FIELD

The present disclosure relates to portable fuel tanks for holding fuel such as gasoline or diesel fuel.

BACKGROUND

U.S. Pat. No. 4,911,203 discloses a coupling assembly for connecting conduits conveying fuel under pressure, which utilizes a pair of seals so as to define a chamber for the containment of excess pressurized fuel during the disengagement of the coupling members. A protective shield or flange is provided around the locking mechanism so as to prevent inadvertent contact with the release mechanism and accidental disengagement of the coupling members.

U.S. Pat. No. 8,651,068 discloses a device for separating water and contaminants from fuel that is being supplied from an upstream fuel reservoir to a downstream internal combustion engine. The device comprises a housing configured to couple with the upstream fuel reservoir, the housing having an inlet receiving fuel, water and contaminants, and an outlet discharging the fuel; a gravity separator disposed in the housing between the inlet and the outlet, the gravity separator separating the water from the fuel; and a filter disposed in the housing between the inlet and the outlet, the filter filtering the contaminants from the fuel.

U.S. Pat. No. 9,114,701 discloses a barrier apparatus for use with fuel tanks. An example barrier apparatus includes a protective barrier having a support surface and a wall protruding from the support surface to define a cavity. The support couples the protective barrier to a surface of the fuel tank. A weld pad is disposed within the cavity adjacent the support surface.

U.S. Pat. No. 9,315,099 discloses a fuel fill apparatus for use with fuel tanks. An example fuel fill apparatus includes a body to removably couple to a neck of a fuel tank. The body has an opening to receive a fuel nozzle and guide liquid fuel from the fuel nozzle to a cavity of the fuel tank. A nozzle retainer retains the fuel nozzle in the opening. A positioner in the opening offsets the fuel nozzle relative to a central axis of the opening such that an aspirator of the fuel nozzle is positioned adjacent an inner wall of the opening when the fuel nozzle is inserted in the opening. The positioner maintains a fuel nozzle outlet opening substantially parallel relative to a central axis of the opening during a fueling event.

U.S. Pat. No. 9,409,476 discloses a fuel fill apparatus for use with fluid delivery systems. An example fuel fill apparatus includes a body defining a throat area adjacent an opening of the body where the opening is configured to receive a fuel cap. A fuel fill portion defines a first passageway extending at a non-perpendicular angle relative to a longitudinal axis of the opening and a vent portion defines a second passageway. The first passageway is fluidly coupled to the second passageway via the throat area and a fuel nozzle retainer is disposed within the throat area.

U.S. Pat. No. 9,605,803 discloses a fuel tank apparatus and related methods. An example method includes placing a first end of a flexible coupling through an access opening formed on a wall of a fuel tank and into a first end of a guide positioned in a cavity of the fuel tank; feeding the first end of the flexible coupling in a first direction through the guide and away from the access opening; redirecting the first end of the flexible coupling towards the access opening by continuing to feed the flexible coupling the first direction; coupling a first fuel component to the first end of the flexible coupling when the first end of the flexible coupling is accessible via the access opening; and directing the flexible coupling in a second direction opposite the first direction via the guide to couple the first fuel component in the cavity of the fuel tank at a position away from the access opening.

U.S. Pat. No. 10,086,691 discloses a pressure relief apparatus for use with fuel delivery systems. An example pressure relief apparatus includes a body defining a cavity and an annular wall projecting from a lower surface of the cavity. A first valve includes a first valve body defining a first flow passage between a first inlet to be oriented toward atmospheric pressure and a first outlet to be oriented toward a fuel tank. The first valve body houses a first flow control member to control fluid flow through the first flow passage between the first inlet and the first outlet. The first valve body projects from the lower surface of the cavity and toward an upper surface of the annular wall a distance substantially equal to a depth between the lower surface and the upper surface of the annular wall.

The above patents are hereby incorporated herein by reference, in their entireties.

SUMMARY

This Summary is provided to introduce a selection of concepts that are further described herein below in the Detailed Description. This Summary is not intended to identify key or essential features of the claimed subject matter, nor is it intended to be used as an aid in limiting scope of the claimed subject matter.

A portable fuel tank assembly according to one example of the present disclosure comprises a portable fuel tank configured to hold fuel and a support configured to be connected to a supporting surface and configured to hold the fuel tank stationary with respect to the supporting surface. The fuel tank comprises a first quick connector configured for fluid communication with the fuel in the fuel tank. The support comprises a second quick connector configured to mate and provide fluid communication with the first quick connector. The fuel tank and support are configured such that securing the fuel tank in the support simultaneously mates the second quick connector to the first quick connector to provide for fluid communication between the second quick connector and the fuel in the fuel tank.

In one example, the second quick connector is located in a housing that is integral with the support. In one example, the assembly further comprises a fuel demand valve located in the housing, downstream of and in fluid communication with the second quick connector.

In one example, the support comprises a piloting feature that mates with a corresponding piloting feature on an exterior surface of the fuel tank. In one example, the piloting features on the support and the fuel tank are configured to be press fit together to secure the fuel tank to the support.

In one example, the fuel tank is configured to deflect more on a portion of the fuel tank that is configured to face the support when the fuel tank is secured in the support, and the support is configured to enclose the deflected portion of the fuel tank.

In one example, the support is configured to rest on a horizontal supporting surface, and the support comprises an outer lip configured to prevent the fuel tank from moving horizontally after being secured in the support.

In one example, the second quick connector is located in a housing that is integral with the support, and the housing projects vertically upward from the support such that the second quick connector is configured to connect to the first quick connector proximate an upper end of the fuel tank.

In one example, an upstream end of the second quick connector is configured to be connected to the first quick connector, and the assembly further comprises a fuel hose coupled to a downstream end of the second quick connector.

In one example, the assembly further comprises a primer bulb downstream of and in fluid communication with the second quick connector, and the support is configured to retain the primer bulb at least when the primer bulb is not in use.

A support for holding a portable fuel tank according to one example of the present disclosure comprises a support quick connector configured to mate and provide fluid communication with a tank quick connector on the fuel tank and a support piloting feature for mating with a tank piloting feature on the fuel tank and for holding the fuel tank in place on the support. The support is configured such that the support quick connector and the tank quick connector are mated at the same time the support piloting feature and the tank piloting feature are mated as the fuel tank is installed on the support.

In one example, the support quick connector is located in a housing that is integral with the support. In one example, the support further comprises a fuel demand valve located in the housing, downstream of and in fluid communication with the support quick connector.

In one example, the support comprises a base configured to rest on a horizontal supporting surface. In one example, the support comprises an outer lip above the base configured to prevent the fuel tank from moving horizontally after being secured in the support.

In one example, the support piloting feature and the tank piloting feature are configured to be press fit together to secure the fuel tank to the support.

In one example, the support is configured to enclose a portion of the fuel tank that deflects outwardly.

In one example, the support quick connector is located in a housing that is integral with the support, and the housing projects vertically upward from the support such that the support quick connector is configured to connect to the tank quick connector proximate an upper end of the fuel tank.

In one example, an upstream end of the support quick connector is configured to be connected to the tank quick connector, and the support further comprises a fuel hose connected to a downstream end of the support quick connector.

In one example, the support further comprises a primer bulb downstream of and in fluid communication with support quick connector, and the support is configured to retain the primer bulb at least when the primer bulb is not in use.

BRIEF DESCRIPTION OF THE DRAWINGS

Examples are described with reference to the following drawing figures. The same numbers are used throughout to reference like features and components.

DETAILED DESCRIPTION

Figure 1:
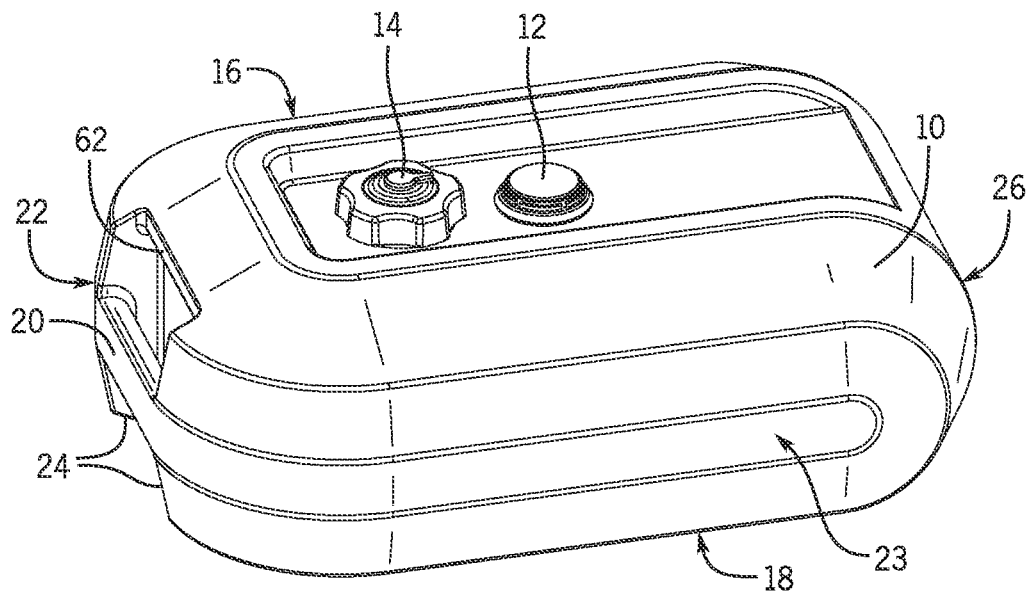
FIG. 1 illustrates a portable fuel tank according to the present disclosure.

Before any embodiments of the invention are explained in detail, it is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless otherwise specified or limited, the phrases "at least one of A, B, and C," "one or more of A, B, and C," and the like, are meant to indicate A, or B, or C, or any combination of A, B, and/or C, including combinations with multiple instances of A, B, and/or C. Likewise, unless otherwise specified or limited, the terms "mounted," "connected," "linked," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top," "bottom," "front," "back," "left," "right," "lateral" or "longitudinal" features is generally intended as a description only of the orientation of such features relative to a reference frame of a particular example or illustration. Correspondingly, for example, a "top" feature may sometimes be disposed below a "bottom" feature (and so on), in some arrangements or embodiments. Additionally, use of the words "first," "second", "third," etc. is not intended to connote priority or importance, but merely to distinguish one of several similar elements from another. Unless otherwise specified or limited, the word "about" means±10%.

FIG. 1 shows a portable fuel tank 10 configured to hold fuel, such as gasoline or diesel fuel. The fuel tank 10 may be made of a plastic, such as polyethylene, and may have multiple layers, including, for example, a vapor impermeable layer of ethylene vinyl alcohol between inner and outer layers of polyethylene. The fuel tank 10 may be blow molded, rotomolded, or thermoformed, as is known. Other materials and methods of manufacture could be used as known to those having ordinary skill in the art. The fuel tank 10 has a fuel gauge 12 and a fill opening covered by a cap 14, both located on an upper end 16 of the fuel tank 10. The fuel tank 10 also has a lower end 18 and a handle 20 on a first side 22 of the fuel tank 10, about midway between the upper end 16 and the lower end 18. The handle 20 is formed by a concavity 24 in the side 22 of the fuel tank 10, which concavity 24 extends from the upper end 16 to the lower end 18 of the fuel tank 10. The fuel tank 10 also has a second side 26, opposite the first side 22, as well as opposite longitudinal sides 21 (FIG. 3) and 23. The configuration of the fuel tank 10 can vary from that shown here.

Figure 2:
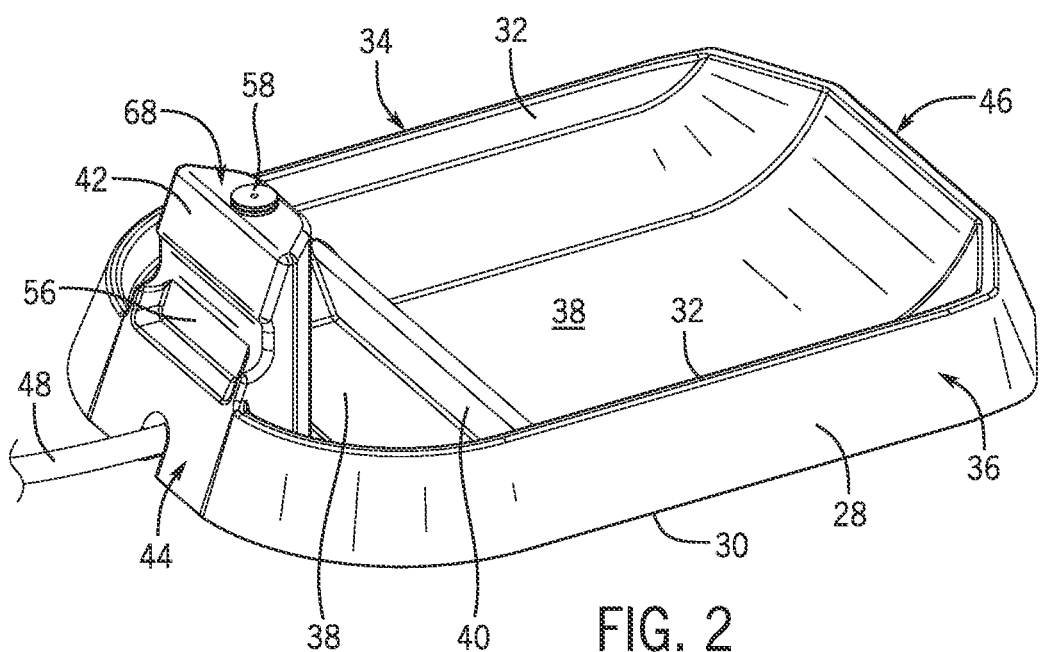
FIG. 2 illustrates a support for holding the portable fuel tank.

FIG. 2 illustrates a support 28 for holding the portable fuel tank 10. The support 28 can be made of plastic, such as polyethylene or polystyrene. The support 28 can be manufactured by injection molding. Other suitable materials and manufacturing processes may be used depending on the configuration of the support 28, which may vary from that shown here. The support 28 has a base 30 configured to rest on a horizontal supporting surface (see FIG. 4). The support 28 also has an outer lip 32 above the base 30, which outer lip 32 is present at least on two opposite longitudinal sides 34, 36 of the support 28. The base 30 extends around, and together with the lips 32 defines, a central concave portion 38 of the support 28. The central concave portion 38 is split into two by the presence of a support piloting feature 40 extending laterally across the support 28. Another support piloting feature is in the form of a housing 42 at a first end 44 of the support 28. The housing 42 can be integrally formed as part of the support 28 or can be attached to the support 28 after the remainder of the support 28 is molded. The support 28 also has an opposite second end 46, which slopes downwardly from the lip 32 toward the central concave portion 38. A fuel hose 48 extends from the support 28 by way of a notch in the base 30.

Figure 3:
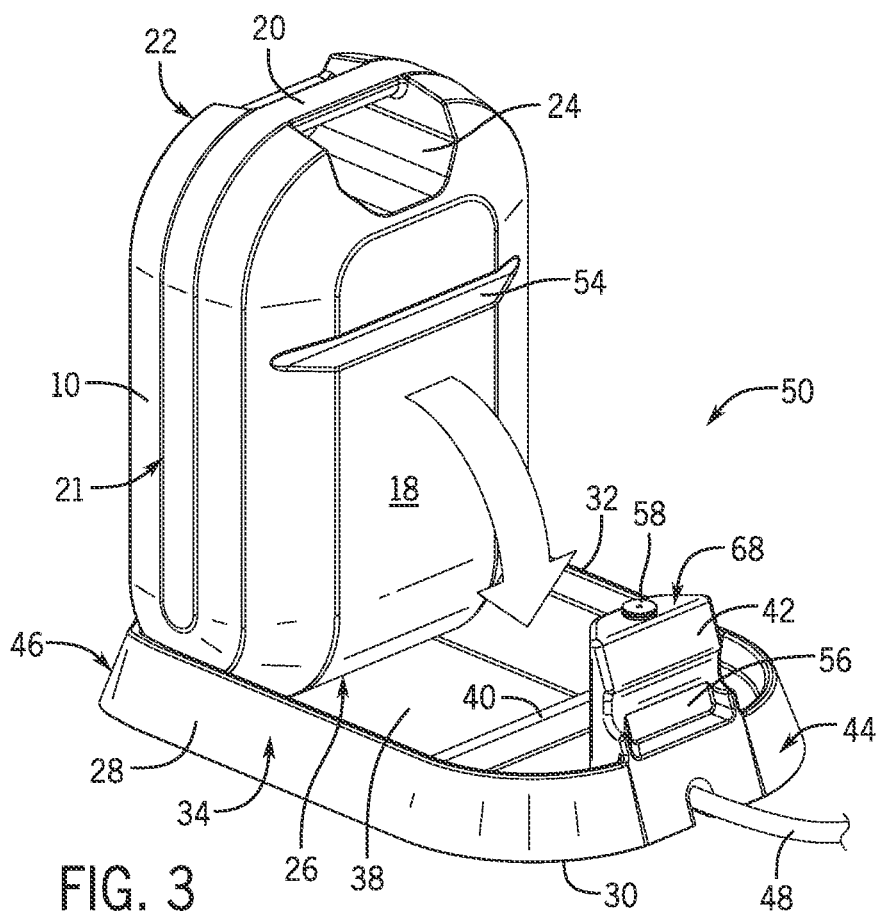
FIG. 3 illustrates the portable fuel tank in process of being installed on the support.
Figure 4:
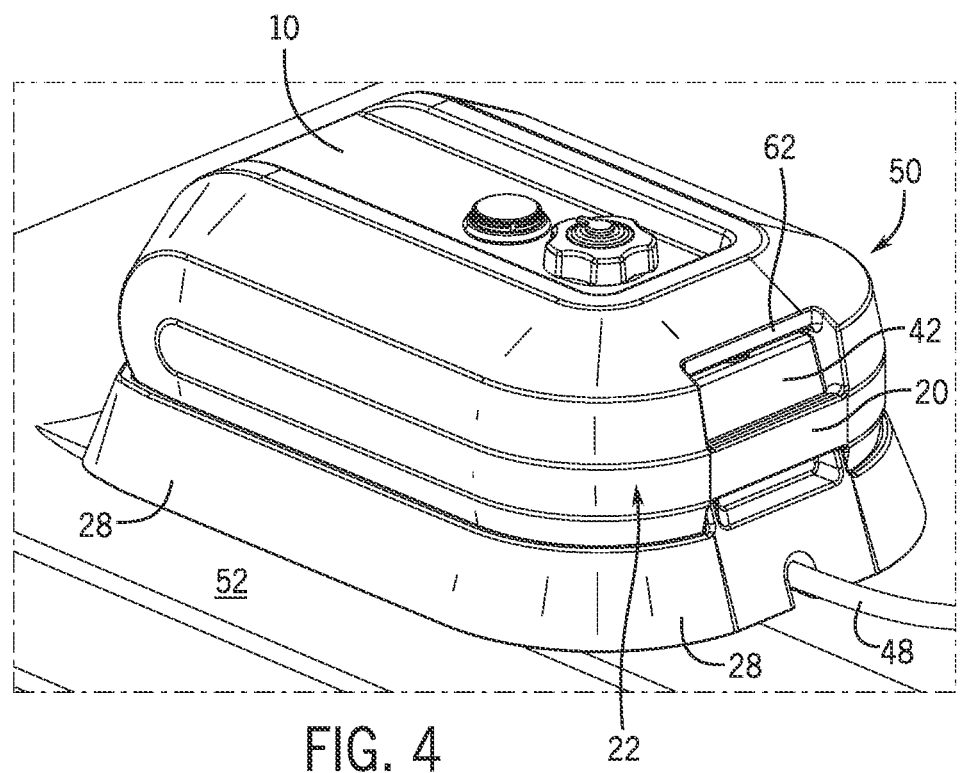
FIG. 4 illustrates the portable fuel tank fully installed on the support.

FIGS. 3 and 4 show the support 28 and fuel tank 10 as part of a portable fuel tank assembly 50. FIG. 3 shows the portable fuel tank assembly 50 in process of being assembled, while FIG. 4 shows the portable fuel tank assembly 50 fully assembled. The portable fuel tank assembly 50 includes the portable fuel tank 10 and the support 28, which is configured to be connected to a supporting surface 52 (FIG. 4) and configured to hold the fuel tank 10 stationary with respect to the supporting surface 52. In one example, the supporting surface 52 is the deck of a marine vessel. The support 28 can be connected to the supporting surface 52 by way of adhesive, bolts, screws, brackets, and/or straps, as is known to those having ordinary skill in the art. By way of non-limiting example, brackets that are pre-fastened to the supporting surface 52 can fit into slots on the underside of the support 28, which can be slid into locking engagement with the brackets. In other examples, the support 28 can be held to a vertical or angled support surface, such as to the transom of a marine vessel.

As noted hereinabove, the support 28 has a support piloting feature 40, which is in the form of a wall protruding vertically upwardly from the central concave portion 38 of the support 28, in the case in which the support 28 is attached to a horizontal supporting surface 52. The support piloting feature 40 is sized and shaped for mating with a tank piloting feature 54 on the fuel tank 10, which here is shown as an indentation extending across the lower end 18 of the fuel tank 10. Interaction of the support piloting feature 40 and the tank piloting feature 54 holds the fuel tank 10 in place on the support 28. For example, the support piloting feature 40 and the tank piloting feature 54 are configured to be press fit together to secure the fuel tank 10 to the support 28. For this purpose, the support piloting feature 40 can be made slightly wider in the direction from end 44 to end 46 than the tank piloting feature 54, and the tank piloting feature 54 will deflect to accept the support piloting feature 40.

Although the support piloting feature 40 is shown as a protruding wall and the tank piloting feature 54 is shown as a depression or indentation, in other examples, the support piloting feature is concave and the tank piloting feature is convex. In still other examples, the piloting features could each be a series of mating indentations and projections on each of the fuel tank 10 and the support 28. The piloting features could have any shape, and need not be the wedge-shaped wall and indentation shown here. More than one piloting feature could be provided on each of the lower end 18 of the fuel tank 10 and the central concave portion 38 of the support 28. Additional or alternative piloting features could be provided on the lips 32 of the support 28 and the sides 21, 23 of the fuel tank 10. Further, although both piloting features 40, 54 are shown as being integrally molded with the fuel tank 10 and support 28, respectively, in other examples, one or both of the piloting features 40, 54 is attached to the fuel tank 10 or support 28 after the fuel tank 10 or support 28 is molded.

To install the fuel tank 10 on the support 28, the side 26 of the fuel tank 10 can be placed on the support 28 toward the end 46 thereof, as shown in FIG. 3. Then, the fuel tank 10 can be pivoted downwardly as shown by the arrow, aided by the gentle slope of the central concave portion 38, to rest the lower end 18 of the fuel tank 10 in the central concave portion 38 of the support 28. Correct positioning of the fuel tank 10 with respect to the support 28 is ensured by the interaction of the piloting features 40, 54. Furthermore, because the support 28 comprises a piloting feature 40 that mates with a corresponding piloting feature 54 on an exterior surface of the fuel tank 10 with a press fit, the fuel tank 10 can be held securely in the support 28 despite shifting of the contents within the fuel tank 10, which might otherwise tend to tip the fuel tank 10 onto its side. Furthermore, in the case in which the support 28 is configured to rest on a horizontal supporting surface 52, the outer lips 32 are configured to prevent the fuel tank 10 from moving horizontally after being secured in the support 28. One having ordinary skill in the art would understand that more robust piloting features (also acting as connection features) and/or a wider end 46 may be required if the support 28 is to be attached to a vertical or angled supporting surface, in order to maintain the fuel tank 10 in the support 28 against the force of gravity.

In one example, the support 28 is configured to enclose a portion of the fuel tank 10 that deflects outwardly due to bloating. For example, the fuel tank 10 is configured to deflect more on a portion of the fuel tank 10 that is configured to face the support 28 when the fuel tank 10 is secured in the support 28. For example, the lower end 18 of the fuel tank 10 can be figured to deflect more than the upper end 16 or the remaining sides 21, 22, 23, 26 by manufacturing the lower end 18 to be less rigid and/or thinner than the remainder of the fuel tank 10, although still with sufficient properties to prevent bursting. In such an example, the support 28 is configured to enclose the deflected portion (e.g., the lower end 18) of the fuel tank 10 within the perimeter of the base 30 between the lower end 18 of the fuel tank 10 and the upper surface of the central concave portion 38. For example, the support 28 and fuel tank 10 can be proportioned such that the sides 21, 23 of the fuel tank 10 rest on the lips 32 of the support 28 with the lower end 18 of the fuel tank 10 slightly above the upper surface of the central concave portion 38. As internal pressure causes the fuel tank 10 to bloat, any deflection of the fuel tank 10 is concentrated at the lower end 18, which deflects to fill the space between the outer surface of the lower end 18 of the fuel tank 10 and the upper surface of the central concave portion 38.

As was mentioned above, the housing 42 at the end 44 of the support 28 also acts as a support piloting feature. The corresponding tank piloting feature is the handle 20 and concavity 24 in the side 22 of the fuel tank 10. More specifically, the housing 42 has an indentation 56 across one side thereof. The upper end of the housing 42 can be inserted into the concavity 24 on the side 22 of the fuel tank 10, and the fuel tank 10 can be lowered onto the support 28 until the handle 20 fits into place in the indentation 56. The housing 42 may be designed such that the upper end 68 of the housing 42 bends slightly inwardly toward the central concave portion 38 of the support 28 while the handle 20 passes thereover. Once the handle 20 has passed over the upper end 68 of the housing 42, the upper end 68 of the housing 42 can revert to its initial position to secure the handle 20 in the indentation 56. The final installed position of the fuel tank 10 on the support 28, with the handle 20 secured in the indentation 56, is shown in FIG. 4.

The support 28 not only holds the portable fuel tank 10 in place with respect to the supporting surface 52, but also provides for fluid connection between the fuel tank 10 and an engine requiring the fuel. In one non-limiting example, the supporting surface 52 is the deck of a marine vessel, and the engine is one installed in a propulsion device such as an outboard motor. To that end, the support 28 can be provided with a support quick connector 58 (see FIGS. 2 and 3) at the upper end of the housing 42, and the fuel tank 10 can be provided with a tank quick connector (60, FIG. 5) provided on the underside of an overhanging portion 62 of the upper end 16 of the fuel tank 10, within the concavity 24. As will be described in more detail below, an upstream end 64 of the tank quick connector 60 is configured to draw fuel from the fuel tank 10, an upstream end 74 of the support quick connector 58 is configured to be connected to the tank quick connector 60, and the above-mentioned fuel hose 48 is connected to a downstream end 76 of the support quick connector 58, which fuel hose 48 leads to the engine requiring the fuel.

Figure 5:
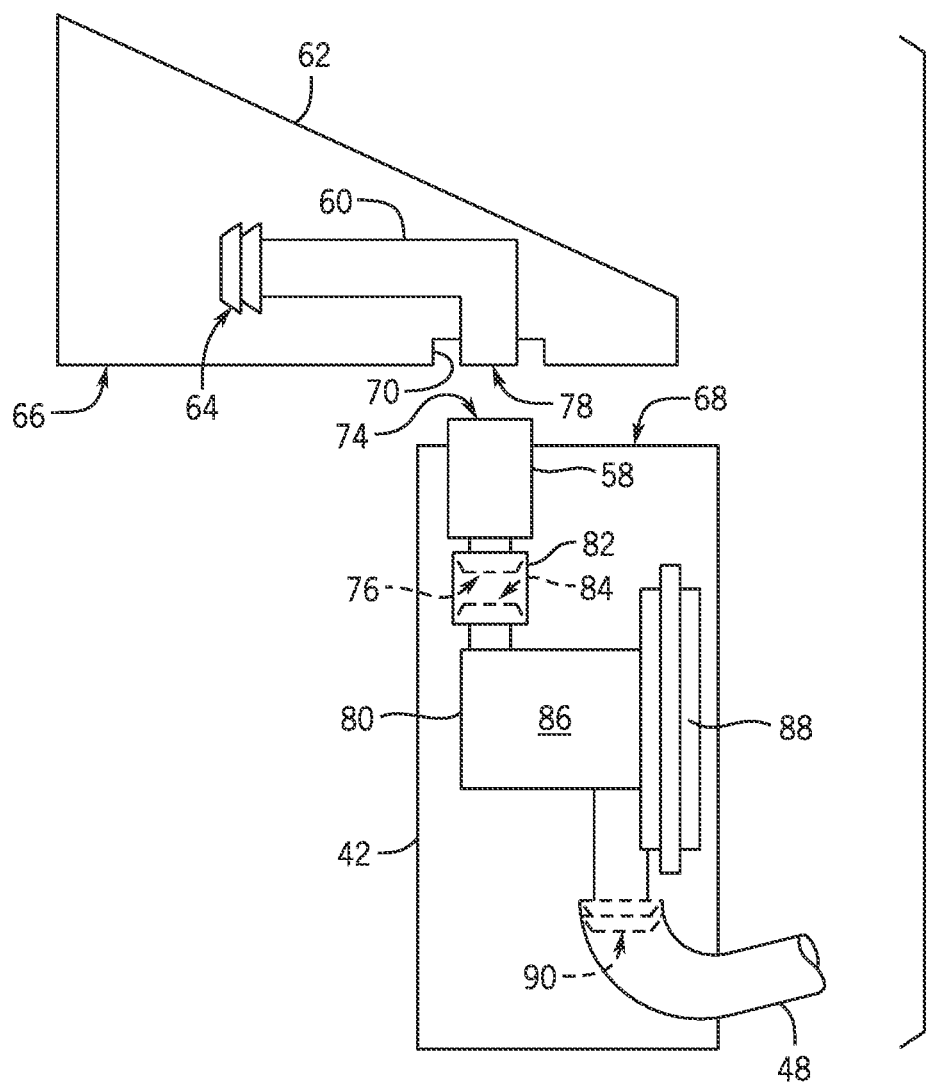
FIG. 5 is a schematic showing portions of the fuel tank and the support.

FIG. 5 is a highly schematic cross-sectional view of the overhanging portion 62 of the upper end 16 of the fuel tank 10 and the housing 42 of the support 28, viewed from the left side of the portable fuel tank assembly 50 (with respect to the view of FIG. 4) just before the fuel tank 10 is fully installed on the support 28. As shown, the fuel tank 10 comprises a first quick connector (tank quick connector 60) configured for fluid communication with the fuel in the fuel tank 10. For example, the tank quick connector 60 can have a barbed upstream end 64 that is configured to connect with a hose or other conduit (not shown) that extends downwardly within the fuel tank 10, to suction fuel from the bottom of the fuel tank 10. An opposite end of the tank quick connector 60 can be provided with a quick connect feature, as is well known in the art. The tank quick connector 60 can be L-shaped, as shown here, in order to change direction from the vertical connection to the support quick connector 58 to the horizontal direction into the interior of the fuel tank 10. Of course, if the overhanging portion 62 of the upper end 16 of the fuel tank 10 is not sloped as shown in this example, it may be possible to use a tank quick connector without an elbow, such as if there is room between the bottom surface 66 of the overhanging portion 62 and the upper end 16 of the fuel tank 10 to fit the hose or other conduit over the barbed upstream end 64 of the tank quick connector 60.

The support 28, meanwhile, comprises a second quick connector (support quick connector 58) configured to mate and provide fluid communication with the first quick connector (tank quick connector 60). As noted hereinabove and shown in FIG. 5, the second/support quick connector 58 is located in a housing 42 that is integral with the support 28. The housing 42 projects vertically upward from the support 28, such that the second/support quick connector 58 is configured to connect to the first/tank quick connector 60 proximate the upper end 16 of the fuel tank 10. More specifically, the support quick connector 58 protrudes from the upper end 68 of the housing 42 and is configured to fit into a mating recess 70 in the bottom surface 66 of the overhanging portion 62 of the upper end 16 of the fuel tank 10. The upper end of the support quick connector 58 is configured to mate with the lower end of the tank quick connector 60 within the recess 70. Such mating quick connectors are well known in the art. In one example, the quick connectors are sprayless quick connectors similar to those sold by Attwood Corporation of Lowell, Michigan, part numbers 8838HF6, 8838TM6, 8838US6, and 8838HM6.

Figure 6:
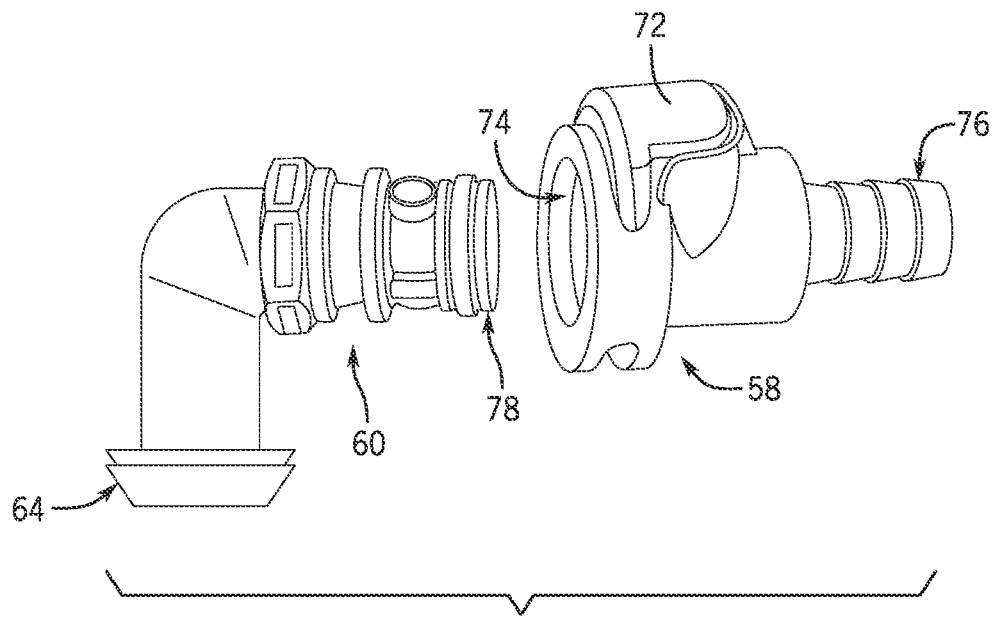
FIG. 6 illustrates one example of quick connectors for use with the fuel tank and support of the present disclosure.

In one example, the quick connectors are as shown in FIG. 6. The support quick connector 58 can be a female quick connector having a release button 72 (which is oriented on the housing 42 so as to be accessible to a user), an open upstream end 74 for receiving the male quick connector, and a barbed downstream end 76 for connecting to a tube or other conduit 82 (FIG. 5) downstream of the support quick connector 58. The tank quick connector 60 can be a female quick connector with a quick connect downstream end 78 for insertion into the open upstream end 74 of the support quick connector 58. One or both of the support quick connector 58 and the tank quick connector 60 can have an internal valve, such as a check valve (e.g., a spring-loaded check valve), which automatically closes upon disconnection of the parts to prevent leakage. The check valves are opened by either mechanical interaction between the valves when the support quick connector 58 is fully mated with the tank quick connector 60 and/or by fluid pressure as fuel is pumped from the fuel tank 10 through the mated quick connectors 58, 60.

According to the present disclosure, the fuel tank 10 and support 28 are configured such that securing the fuel tank 10 in the support 28 simultaneously mates the second/support quick connector 58 to the first/tank quick connector 60 to provide for fluid communication between the second/support quick connector 58 and the fuel in the fuel tank 10. This is provided for by the piloting features 40, 54 on the support 28 and fuel tank 10, respectively, which visually show the user where the fuel tank 10 needs to be lined up with the support 28, thus also aligning the housing 42 and concavity 24. The housing 42, concavity 24, and handle 20 are configured such that the housing 42 fits with relatively little tolerance within the concavity 24, such that alignment of the housing 42 within the concavity 24 ensures that the support quick connector 58 and tank quick connector 60 are necessarily also aligned. Subsequent snapping of the handle 20 into the indentation 56 also snaps the tank quick connector 60 into the support quick connector 58, providing fluid communication between the two. Thus, the support 28 is configured such that the support quick connector 58 and the tank quick connector 60 are mated at the same time the support piloting features 40, 42 and the tank piloting features 54, 24 are mated as the fuel tank 10 is installed on the support 28.

Although the support quick connector 58 is shown as the female connector herein, and the tank quick connector 60 is shown as the male connector, those having ordinary skill in the art would understand that the gender of the connectors could be switched with very little adaptation of the housing 42 of the support 28 and/or overhanging portion 62 of the fuel tank 10 being required.

Figure 7:
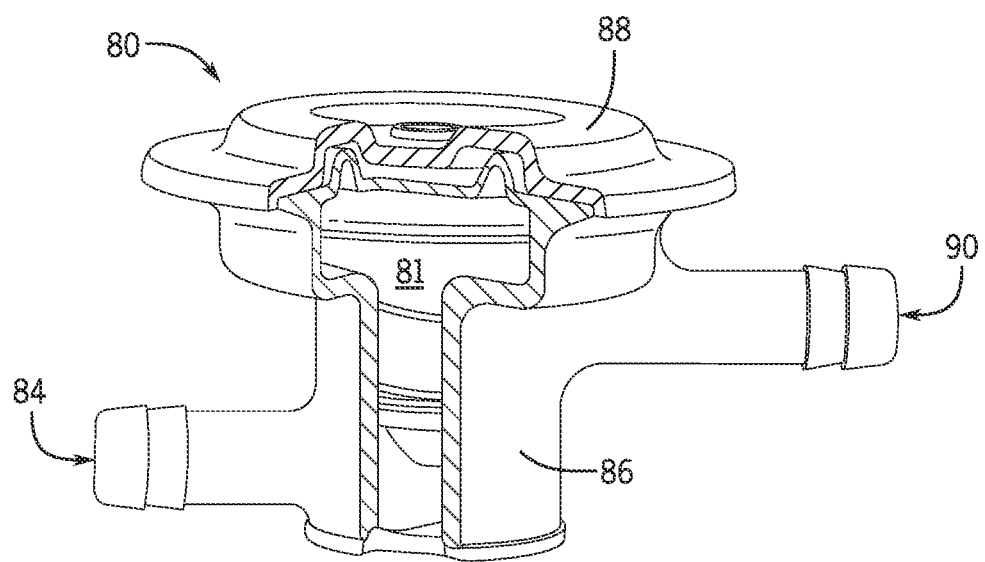
FIG. 7 illustrates one example of a fuel demand valve for use with the present disclosure.

Returning to FIG. 5, the portable fuel tank assembly 50 may further comprise a fuel demand valve 80 located in the housing 42, downstream of and in fluid communication with the second/support quick connector 58. In this example, the support quick connector 58 is connected at its downstream end 76 to an intermediate hose or other conduit 82, which is in turn connected to the inlet end 84 of the fuel demand valve 80. In other examples, it is possible that the support quick connector 58 and the fuel demand valve 80 are manufactured as one part, without the requirement for a separate conduit 82 between the two. The fuel demand valve 80 includes a valve housing 86, a cap 88, and an outlet end 90. One example of a fuel demand valve that can be used is sold by Attwood Corporation of Lowell, Michigan, part number 9300FDV7, which is shown in partial cutaway in FIG. 7. The fuel demand valve 80 includes an internal valve 81, which moves against the force of a spring when pressure at the outlet end 90 is less than atmospheric pressure (due to a vacuum created by a pump downstream of the fuel demand valve 80) so as to open the valve 81 and provide for fluid communication between the inlet end 84 and the outlet end 90. When the pump downstream of the fuel demand valve 80 is turned off, the spring forces the valve 81 to its initial position, which prevents fluid communication between the inlet end 84 and the outlet end 90. Fuel demand valves other than the particular example shown and described herein could be used.

Returning to FIG. 5, the fuel hose 48 is coupled to the downstream end 76 of the second/support quick connector 58. Here, the coupling is by way of the conduit 82 and the fuel demand valve 80, but in instances in which a fuel demand valve is provided further downstream (and external to the housing 42), the fuel hose 48 can be connected directly to the downstream end 76 of the support quick connector 58.

Figure 8:
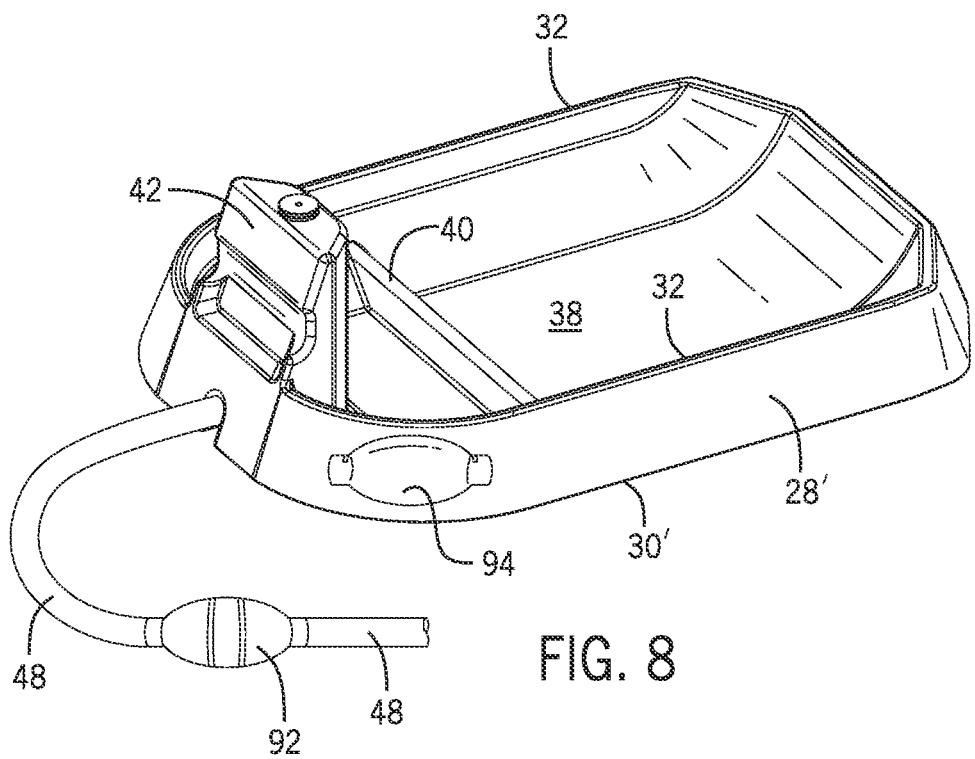
FIG. 8 illustrates another example of a support for the portable fuel tank.

In one example, as shown in FIG. 8, the portable fuel tank assembly 50 further comprises a primer bulb 92 downstream of and in fluid communication with the second/support quick connector 58. An exemplary support 28' is configured to retain the primer bulb 92 at least when the primer bulb 92 is not in use. For example, the support 28' may have a recessed area 94 carved out of the base 30', having the shape of the primer bulb 92, but a slightly larger footprint, to allow for insertion of the primer bulb 92 therein. The recessed area 94 may have tabs around its perimeter that contact the elastomeric outer surface of the primer bulb 92 to retain the primer bulb 92 in the recessed are 94. The primer bulb 92 is able to be removed from the recessed area 94 by pulling it past the tabs, such that the primer bulb 92 can be actuated to prime the pump connected downstream of the primer bulb 92. In another example, the primer bulb 92 can be retained on the support 28' by a bracket or strap that is attached to the base 30'. In yet another example, the primer bulb 92 is permanently built into the support 28' and can be actuated while remaining connected to the support 28.

Figure 9:
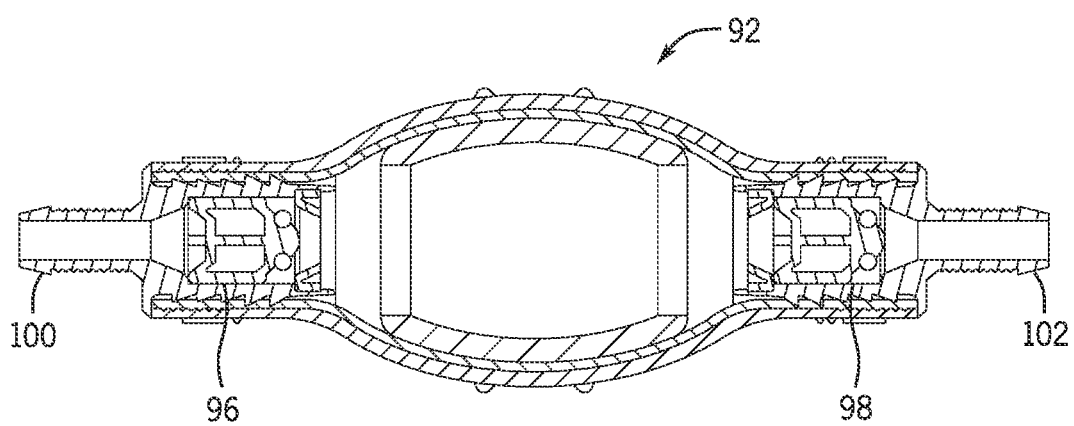
FIG. 9 illustrates one example of a primer bulb for use with the present disclosure.

One example of the primer bulb 92 is shown in FIG. 9, and is sold by Attwood Corporation of Lowell, Michigan, part number 93038LP7, 93516LP7, or 93014LP7. The primer bulb 92 includes check valves 96, 98 at both the upstream and downstream ends thereof to provide for quick priming of the pump and high flow when the pump is running. The primer bulb 92 may include a three-layer construction to resist collapse, prevent fuel evaporation, and prevent ballooning and bursting. Barbs 100, 102 at either end provide for connection to the fuel hose 48.

The support 28, 28' of the present disclosure keep 2 the fuel tank 10 off the supporting surface 52, which in the case of a marine vessel deck can be covered with water and debris. Furthermore, the support 28, 28' provides a way to simultaneously and with one motion secure the fuel tank 10 with respect to the supporting surface 52 and connect the fuel tank 10 to the fuel hose 48 that leads to the engine requiring the fuel. Additionally, the support 28, 28' provides a way to hide deflection of the fuel tank 10 due to bloat.

In the present description, certain terms have been used for brevity, clarity, and understanding. No unnecessary limitations are to be implied therefrom beyond the requirement of the prior art because such terms are used for descriptive purposes only and are intended to be broadly construed. The different apparatuses described herein may be used alone or in combination with other apparatuses. Various equivalents, alternatives and modifications are possible within the scope of the appended claims.

What is claimed is:

1. A portable fuel tank assembly comprising:
a portable fuel tank configured to hold fuel; and
a stationary support configured to be connected to a supporting surface and configured to hold the fuel tank stationary with respect to the supporting surface;
wherein the fuel tank comprises a first quick connector configured for fluid communication with the fuel in the fuel tank;
wherein the stationary support comprises a second quick connector configured to mate and provide fluid communication with the first quick connector; and
wherein the fuel tank and the stationary support are configured such that the fuel tank is secured in the stationary support by placing a side of the fuel tank on the stationary support and pivoting only the fuel tank with respect to the stationary support to rest an end of the fuel tank on the stationary support thereby simultaneously mating the first quick connector to the second quick connector to provide for fluid communication between the second quick connector and the fuel in the fuel tank.

2. The assembly of claim 1, wherein the second quick connector is located in a housing that is integral with the stationary support.

3. The assembly of claim 2, further comprising a fuel demand valve located in the housing, downstream of and in fluid communication with the second quick connector.

4. The assembly of claim 1, wherein the stationary support has a support piloting feature laterally extending across the stationary support and the fuel tank has a tank piloting feature that mates with the support piloting feature such that the fuel tank is correctly positioned with respect to the stationary support and the second quick connector mates with the first quick connector.

5. The assembly of claim 4, wherein the tank piloting feature comprises an indentation in which the support piloting feature is received such that the tank piloting feature and the support piloting feature are press fit together to secure the fuel tank to the stationary support.

6. The assembly of claim 1, wherein the fuel tank is configured to deflect on a portion of the fuel tank that is configured to face the stationary support when the fuel tank is secured in the stationary support, and wherein the stationary support is configured to enclose the deflected portion of the fuel tank.

7. The assembly of claim 1, wherein the supporting surface is horizontal;
   wherein the stationary support is configured to rest on the horizontal supporting surface; and
   wherein the stationary support comprises an outer lip configured to prevent the fuel tank from moving horizontally after being secured in the stationary support.

8. The assembly of claim 1, wherein the second quick connector is located in a housing that is integral with the stationary support, and wherein the housing projects vertically upward from the stationary support such that the second quick connector is configured to connect to the first quick connector proximate an upper end of the fuel tank.

9. The assembly of claim 1, wherein the stationary support has a central concave portion in which the fuel tank rests and an outer lip that prevents movement of the fuel tank with respect to the stationary support when the fuel tank is secured to the stationary support.

10. The assembly of claim 1, further comprising a primer bulb downstream of and in fluid communication with the second quick connector, wherein the stationary support is configured to retain the primer bulb at least when the primer bulb is not in use.

11. A stationary support for holding a portable fuel tank, the stationary support comprising:
   a support quick connector configured to mate and provide fluid communication with a tank quick connector on the fuel tank; and
   a support piloting feature for mating with a tank piloting feature on the fuel tank such that the fuel tank is held in place on the stationary support, the support piloting feature mating with the tank piloting feature by placing a side of the fuel tank on the stationary support and further pivoting only the fuel tank with respect to the stationary support such that an end of the fuel tank rests on and extends along the stationary support;
   wherein the stationary support is configured such that the support quick connector and the tank quick connector are mated at the same time the support piloting feature and the tank piloting feature are mated as the fuel tank is installed on the stationary support.

12. The stationary support of claim 11, wherein the support quick connector is located in a housing that is integral with the stationary support.

13. The stationary support of claim 12, further comprising a fuel demand valve located in the housing, downstream of and in fluid communication with the support quick connector.

14. The stationary support of claim 11, wherein the stationary support comprises a base configured to rest on a horizontal supporting surface.

15. The stationary support of claim 14, wherein the stationary support comprises an outer lip above the base configured to prevent the fuel tank from moving horizontally after being secured in the stationary support.

16. The stationary support of claim 11, wherein the support piloting feature and the tank piloting feature are configured to be press fit together to secure the fuel tank to the stationary support.

17. The stationary support of claim 11, wherein the stationary support is configured to enclose a portion of the fuel tank that deflects outwardly.

18. The stationary support of claim 11, wherein the support quick connector is located in a housing that is integral with the stationary support, and wherein the housing projects vertically upward from the stationary support such that the support quick connector is configured to connect to the tank quick connector proximate an upper end of the fuel tank.

19. The stationary support of claim 11, further comprising a central concave portion in which the fuel tank rests and an outer lip that prevents movement of the fuel tank with respect to the stationary support when the fuel tank is secured to the stationary support.

20. The stationary support of claim 11, further comprising a primer bulb downstream of and in fluid communication with the support quick connector, wherein the stationary support is configured to retain the primer bulb at least when the primer bulb is not in use.

* * * * *